United States Patent Office 3,423,456
Patented Jan. 21, 1969

3,423,456
REACTION OF ALLYLIC HALIDES IN THE VAPOR PHASE WITH CARBON MONOXIDE TO FORM 3-ENOYL HALIDES
Irving L. Mador, Hamilton, Ohio, and John A. Scheben, Kenton, Ky., assignors to National Distillers and Chemical Corporation, New York, N.Y., a corporation of Virginia
No Drawing. Continuation-in-part of application Ser. No. 316,550, Oct. 16, 1963. This application Jan. 10, 1966, Ser. No. 519,533
The portion of the term of the patent subsequent to Mar. 14, 1984, has been disclaimed
U.S. Cl. 260—544      8 Claims
Int. Cl. C07c 51/14, 57/02

This application is a continuation-in-part of our application Ser. No. 316,550, filed Oct. 16, 1963, now United States Patent No. 3,309,403.

This invention relates to a process for preparing unsaturated acid halides by reacting allylic halides in the vapor phase with carbon monoxide in the presence of a palladium metal or salt catalyst, and more particularly, to a process for reacting an allylic halide in the vapor phase with carbon monoxide in the presence of palladous chloride or palladium to produce 3-enoyl halides in good yield.

Ser. No. 316,550 describes and claims the preparation of acyl halides from allylic halides by reaction with carbon monoxide in the presence of a platinum group catalyst. In the process of the instant application, this reaction is effected with the allylic halide in the vapor phase, using a palladium metal or salt catalyst. Platinum, rhodium or ruthenium metal or salt catalysts are ineffective in the vapor phase reaction, suggesting that the reaction is in some unexplained way different from a liquid phase reaction.

Chiusoli, Gazz. chim. ital., 89, 1332–1337 (1959), U.S. Patent No. 3,146,256, dated Aug. 25, 1964, has described the synthesis of mono-unsaturated carboxylic acids and esters from allyl chloro derivatives and carbon monoxide or from acetylene and carbon monoxide in the presence of nickel carbonyl as a catalyst. Using allyl chloride as exemplary, the reaction proceeds as follows:

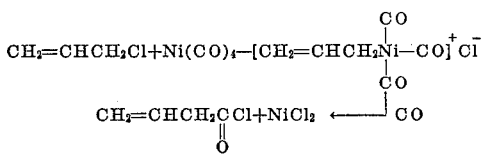

As the above reaction scheme shows, the nickel carbonyl takes part in the reaction, forming an intermediate nickel carbonyl complex with the allylic halide which can then be decomposed by the action of carbon monoxide to form the corresponding acyl halide plus nickel chloride. The nickel chloride can be returned to nickel carbonyl by hydrolysis and reaction with carbon monoxide, and sometimes this takes place in the reaction mixture, but this reverse reaction is not easy to control in a manner to obtain a quantitative yield of the carbonyl. Consequently, as Chiusoli points out, a considerable proportion of nickel carbonyl is changed to nickel chloride, and due to this and the fact that only 40% yields are obtainable, this reaction is not practical from the commercial standpoint as a method for the preparation of acyl halides from allyl chloride. The reaction is, however, of considerable theoretical interest, and it can be carried out not only with carbon monoxide but also with acetylene, which enters into the molecule in the same relative position as the carbonyl group.

In accordance with the instant invention 3-enoyl halides are prepared from allylic halides in the vapor phase by reaction with carbon monoxide in the presence of a palladium catalyst. The reaction proceeds under moderate conditions, in accordance with the following scheme:

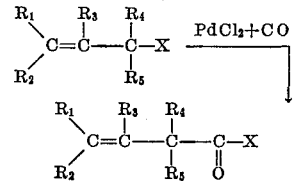

It will be apparent from the above that the reaction product is the 3-enoyl halide derivative of the starting allyl halide.

The reaction is applicable, as the above reaction scheme indicates, to any allylic halide having the formula set out. In this formula, $R_1$, $R_2$, $R_3$, $R_4$ and $R_5$ can be hydrogen, halogen, or an organic radical, such as an alkyl group having from one to about nine carbon atoms; an aryl group having from six to about thirty carbon atoms, including aralkyl and alkaryl groups in which each alkyl or alkylene substituent may have up to fifteen carbon atoms, and having from one to five such substituents per aryl nucleus; cycloalkyl groups having from six to about thirty carbon atoms, including alkyl-substituted cycloalkyl groups in which each alkyl substituent has up to about fifteen carbon atoms, halogen-substituted alkyl and cycloalkyl groups, the halogen including chlorine, bromine, fluorine, and iodine; and ester-substituted alkyl, aryl and cycloalkyl groups, the ester substituent being of the form COOR wherein R is as defined above for $R_1$, $R_2$, $R_3$, $R_4$ and $R_5$, hydrogen excepted. X is halogen. The R and X halogen can be one or more of chlorine, bromine, fluorine, and iodine.

As exemplary of the alkyl substituents there can be mentioned methyl, ethyl, propyl, isopropyl, butyl, isobutyl, tertiary-butyl, isoamyl, n-amyl, neopentyl, tertiary-amyl, isohexyl, 2-ethylhexyl, nonyl, isononyl, tertiary-nonyl, and heptyl. Exemplary aryl, aralkyl, and alkaryl substituents include phenyl, tolyl, xylyl, isononylphenyl, tertiaryoctyl-phenyl, dodecylphenyl, benzyl, α-phenethyl, β-phenethyl, pentadecylphenyl, mesityl, phenylphenyl, and naphthyl. Exemplary cycloalkyl groups include cyclopentyl, cyclohexyl and cycloheptyl. These substituents may include halogen nitro and ester groups, such as, for example, chloroethyl, 4-bromocyclohexyl, nitrobenzyl, nitrophenyl, and acetylphenyl.

Specific compounds include allyl chloride, allyl bromide, allyl iodide, allyl fluoride, 3-butenyl chloride, 3-pentenyl chloride, 3-decenyl chloride, γ-methyl-3-pentenyl chloride, γ-cyclohexyl allyl chloride, α,α-dimethyl allyl chloride, α-methyl-β-methyl-γ-ethyl-3-heptenyl chloride, α-cyclopentyl allyl bromide, α-phenethyl allyl chloride, γ-methyl-3-butenyl iodide, β-isoamyl allyl fluoride, α-methallyl chloride, β-methallyl chloride, γ-methallyl chloride, β-methallyl bromide, γ-methallyl chloride, γ-methallyl bromide, 1-phenyl-3-chloro-propene-1,1-chlorimethylcyclohexene, ethyl-2-chlorobutene-3, p-nitrocinnamylbromide, and bisallylic halides, such as 1,4-dichloro-2-butene.

The reaction proceeds in the presence of any palladium catalyst, generically referred to in the claims as a "palladium catalyst," including palladium metal and palladium compounds. Palladium salts can, for instance, be the chloride, bromide, nitrate, sulfate, benzoate, or acetate, the palladium oxides such as palladous oxide, and organic complexes of palladium, such as for instance, the benzonitrile, bis-π-allyl, or acetylacetonate complexes, for example, bis(benzonitrile) palladous chloride; and palladous acetylacetonate. The palladium halides are particularly desirable because they are available and give excellent yields and accordingly these are preferred, for instance, palladous chloride and palladous bromide.

Palladium metal or the palladium compound can be supported on an inert carrier such as carbon, alumina, such as activated alumina or sintered alumina spheres, silica and molecular sieves. In many cases, a supported catalyst is preferred.

The support should have a relatively low surface area. A low surface area activated alumina, for example, of 80 to 100 sq. m./g., is superior as a support to a high surface area activated alumina of 350 sq. m./g. Accordingly, supports having a surface area within the range from about 50 to about 200 sq. m./g. are preferred.

The selection of a support will to some extend depend on the allylic halide that is being reacted. Activated carbon, for example, displays a tendency to form 1,2-dichloropropane from allyl chloride, whereas activated alumina shows no such tendency. For good selectivity, an activated alumina, preferably, primarily gamma alumina, is recommended.

The amount of catalyst supplied on the support depends on the catalytic effect. In general, the amount should be within the range from about 0.5% to about 15% based on the palladium metal, by weight of the support. Optimum yields appear to be obtained at amounts within the range from 2 to 10%.

Compounds known to complex with palladium can also be added as co-catalysts. Examples of such ligands include triphenylphosphine, pyridine, benzonitrile, and pentane-1,3-dione. Small amounts of such co-catalysts suffice to give an improved effect. Amounts within the range from about 10 to about 500 mole percent based on the weight of the catalyst can be used.

The proportion of catalyst to allylic halide is in no way critical, and very small amounts give effective results. Amounts within the range from about 0.001 to 20 molar percent based on the amount of the allylic halide can be used. Amounts within the range from about 0.001 to 5 molar percent are preferred. Two or more palladium catalysts can be used in admixture for advantageous effects.

The carbon monoxide is conveniently introduced in gaseous form, and thus the reaction mixture containing the allylic halide is in the vapor phase. In this event, the carbon monoxide and allylic halide vapors can be mixed in the desired proportions, and passed over the catalyst, in a continuous flow reactor, or batchwise. The reaction can be carried out under pressure in a bomb, with rotation of the bomb providing adequate mixing of the catalyst with the reacting gases.

Inasmuch as the carbon monoxide reacts mole for mole with the allylic halide, it will of course be used in an amount of at least one mole per mole of the halide, and preferably in molar excess. Satisfactory molar ratio of CO:allylic halide are within the range from 1:1 to 100:1.

The pressure of carbon monoxide should be superatmospheric, and can range from about 5 to 300 atmospheres. The preferred pressure is within the range from about 10 to about 300 atmospheres.

The reaction proceeds at moderate temperatures, ranging from about 20° to about 250° C. The upper limit of reaction temperature is not critical, and will be determined by the decomposition temperature of the reactants and reaction products. Isomerization to crotonyl halides may occur at high reaction temperatures, for example. At temperatures below 20° C., the reaction rate may be slow, but such temperatures can also be used. An optimum reaction rate is obtained within the range from about 65° C. to about 175° C.

The catalyst contact time can be relatively short. As little as 0.5 second is sufficient to convert at least part of the allylic halide to 3-enoyl halide. Much higher times can be used, ranging up to ten and more minutes in a continuous flow process, and up to several hours in a batch process. The time will be adjusted to the minimum required to effect maximum conversion of allylic halide under the reaction conditions.

At the conclusion of the reaction, the product is recovered, after separating the catalyst if necessary by filtration or by centrifugal separation. The 3-enoyl halide can be separated by condensation at a temperature above the boiling point of the allylic halide.

The vapor phase process is particularly adapted for continuous operation, in which case the catalyst is disposed in a reactor, in a fixed or moving bed and the allylic halide vapor blended with carbon monoxide, and cycled to the reactor, where the gases are flowed through in the required dwell time, and then separated by condensing the 3-enoyl halide. The reactor can, if desired, be in elongated form, with the traverse time equal to the reaction time. Any unreacted allylic halide can be recycled to the starting material.

The vapor phase process offers several advantages over the liquid phase process. Relatively simple flow-type equipment can be used, instead of a large pressure reactor. The catalyst can be kept in a bed, whether fixed or moving, which is easily separated from the gaseous reaction mixture. The 3-enoyl halide can be separated from the mixture by condensation, eliminating a fractional distillation separation. The formation of high-boiling by-products is held to a minimum. Overall, the process can thus be operated quite simply, on a continuous basis, with recycling of unreacted allylic halide provided for, thus making a low per pass yield completely acceptable.

The following examples in the opinion of the inventors represent preferred embodiments of this invention.

EXAMPLES 1 TO 11

A catalyst was prepared composed of 3% palladium metal on sintered activated alumina spheres, surface area 100 sq. m./g. Nine grams of catalyst was loaded into a reactor 2¾ inches in diameter by 11 inches long. A vapor mixture composed of 3.9 weight percent allyl chloride and 97.1 weight percent carbon monoxide was then passed over this catalyst, at the carbon monoxide pressure noted in the table below, and at the reaction temperature and flow rate noted. The contact time with the catalyst varied from 0.5 to 7 seconds. The yield of but-3-enoyl chloride obtained in millimoles per hour is given in the table. It is evident in this process reasonable yields are obtainable under moderate reaction conditions and short reaction times.

TABLE I

| Example No. | Temp. (° C.) | CO pressure (atm.) | Reaction mixture flow rate (l./min.) | Mmoles/hr. of but-3-enoyl chloride |
|---|---|---|---|---|
| 1 | 73 | 63.8 | 0.13 | 0.1 |
| 2 | 75 | 95.8 | 0.32 | 0.3 |
| 3 | 75 | 95.8 | 0.60 | 0.2 |
| 4 | 85 | 63.8 | 0.13 | 0.15 |
| 5 | 86 | 34 | 0.75 | <0.1 |
| 6 | 86 | 34 | 1.10 | 0.1 |
| 7 | 87 | 34 | 0.16 | 0.1 |
| 8 | 110 | 68 | 0.33 | 0.55 |
| 9 | 111 | 68.7 | 0.14 | 0.98 |
| 10 | 114 | 102 | 1.11 | 1.48 |
| 11 | 115 | 102 | 0.22 | 2.91 |

The process of the invention can be used to prepare 3-enoyl halides that are very difficult to prepare by other methods. These 3-enoyl halides are useful in the normal manner of acyl halides, in that they undergo hydrolysis to form the corresponding 3-enoic acids, and undergo esterification with alcohols to form the corresponding 3-enoic esters. These can be hydrogenated, if desired, to the saturated acid chlorides, acids, and esters. Furthermore, the unsaturated groups make it possible for them to undergo epoxidation reactions, so that they can form 3-epoxy esters and acids. They can also be polymerized by themselves or with other reactive monomers to form complex polymers of varying types, and are useful crosslinking agents for linear polymers.

Having regard to the foregoing disclosure, the following is claimed as the inventive and patentable embodiments thereof:

1. A process for preparing 3-enoyl halides, which comprises reacting a β,γ-unsaturated alkylene halide in the vapor phase with carbon monoxide in the presence of a palladium catalyst to form the 3-enoyl halide.

2. A process in accordance with claim 1 in which the β,γ-unsaturated alkylene halide has the formula:

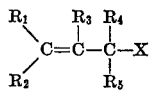

in which $R_1$, $R_2$, $R_3$, $R_4$, and $R_5$ are selected from the group consisting of hydrogen, halogen, and organic radicals having from one to about thirty carbon atoms, and X is halogen.

3. A process in accordance with claim 1, in which the reaction is carried out at a temperature within the range from about 20° C. to about 250° C.

4. A process in accordance with claim 1, in which the carbon monoxide is present at a pressure within the range from about 5 to about 300 atmospheres.

5. A process in accordance with claim 1, in which the palladium catalyst is supported on an inert carrier in an amount within the range from about 0.5 to about 15 percent by weight of the carrier.

6. A process in accordance with claim 1, in which the β,γ-unsaturated halide is allyl chloride.

7. A process in accordance with claim 1, in which the palladium catalyst is palladium metal.

8. A process in accordance with claim 1, in which the CO:β,γ-unsaturated alkylene halide ratio is within the range from 1:1 to about 100:1.

References Cited

UNITED STATES PATENTS

| | | | |
|---|---|---|---|
| 2,053,233 | 9/1936 | Woodhouse | 260—544 |
| 2,689,261 | 9/1954 | Reppe | 260—544 |
| 3,221,045 | 11/1965 | McKeon et al. | 260—468 XR |

OTHER REFERENCES

Fischer et al.: "Zeitschrift fur Naturforschung," vol. 17B (1962) pp. 484–485 Q3.24.

Chiusoli et al.: "Zeitschrift fur Naturforschung," vol. 17B (1962) p. 850 Q3.24.

Hech: "J. Am. Chem. Soc." vol. 85 (1963) pp. 2013–2013 QD1.A5.

Huttel et al.: "Deut. Chem. Ber." vol. 94, pp. 766–780 (1961) QD1.04.

Dehm et al.: "J. Am. Chem. Soc." vol. 82 (1960) pp. 4429–4430 QD1.A5.

LORRAINE A. WEINBERGER, *Primary Examiner.*

P. J. KILLOS, *Assistant Examiner.*